(12) United States Patent
Arthur et al.

(10) Patent No.: US 12,485,687 B2
(45) Date of Patent: Dec. 2, 2025

(54) MULTI-PRINTHEAD END EFFECTOR AND ASSOCIATED SYSTEM AND METHOD

(71) Applicant: The Boeing Company, Chicago, IL (US)

(72) Inventors: Shane E. Arthur, Kirkland, WA (US); John E. Miller, Amherst, OH (US); Matthew Mellin, Seattle, WA (US); Kjersta Larson-Smith, Seattle, WA (US); Anthony Baker, Gilbertsville, PA (US); Luke Ingram, Summerville, SC (US); Steven Dorris, Willard, MO (US); Jonathan Schwedhelm, Seattle, WA (US); Mark Bunker, Shoreline, WA (US); Ryan Petz, Auburn, WA (US); Travis King, Seattle, WA (US); Jesse Castleberry, Seattle, WA (US); Matt Christner, Seattle, WA (US)

(73) Assignee: The Boeing Company, Arlington, VA (US)

( * ) Notice: Subject to any disclaimer, the term of this patent is extended or adjusted under 35 U.S.C. 154(b) by 154 days.

(21) Appl. No.: 18/082,334

(22) Filed: Dec. 15, 2022

(65) Prior Publication Data
US 2024/0198703 A1 Jun. 20, 2024

(51) Int. Cl.
*B41J 25/00* (2006.01)
*B41J 3/407* (2006.01)
(Continued)

(52) U.S. Cl.
CPC ........... *B41J 25/001* (2013.01); *B41J 3/4073* (2013.01); *B41J 25/304* (2013.01);
(Continued)

(58) Field of Classification Search
CPC ...... B41J 25/001; B41J 3/4073; B41J 25/304; B41J 29/38; B05B 13/0278; B05B 13/0431; B05B 15/68
See application file for complete search history.

(56) References Cited

U.S. PATENT DOCUMENTS

| | | |
|---|---|---|
| 7,350,890 B2 | 4/2008 | Baird et al. |
| 8,123,350 B2 | 2/2012 | Cannell et al. |
| | (Continued) | |

OTHER PUBLICATIONS

Extended European Search Report for EP Patent Application No. 23211503.0 dated Apr. 17, 2024.
(Continued)

*Primary Examiner* — Geoffrey S Mruk
(74) *Attorney, Agent, or Firm* — Kunzler Bean & Adamson

(57) ABSTRACT

An end effector and associated systems and methods for printing ink on a surface is disclosed. The end effector comprises a main block including a back plate. The end effector also includes a plurality of slice assemblies slidably coupled to the back plate. Each one of the plurality of slice assemblies includes a printhead and a y-actuator. The y-actuator is selectively operable to extend and retract the printhead, parallel to a y-axis in first directions, and relative to the back plate. The end effector further includes a plurality of z-actuators coupled to the back plate. Each one of the plurality of z-actuators is selectively operable to extend and retract a corresponding one of the plurality of slice assemblies, parallel to a z-axis in second directions, which is perpendicular to the y-axis and relative to the back plate.

20 Claims, 13 Drawing Sheets

(51) Int. Cl.
  *B41J 25/304* (2006.01)
  *B05B 13/02* (2006.01)
  *B05B 13/04* (2006.01)
  *B05B 15/68* (2018.01)
  *B41J 29/38* (2006.01)

(52) U.S. Cl.
  CPC ....... *B05B 13/0278* (2013.01); *B05B 13/0431* (2013.01); *B05B 15/68* (2018.02); *B41J 29/38* (2013.01)

(56) References Cited

U.S. PATENT DOCUMENTS

| | | |
|---|---|---|
| 8,152,260 B2 | 4/2012 | Baird et al. |
| 9,266,353 B2 | 2/2016 | Beier et al. |
| 9,527,275 B1 | 12/2016 | Flannigan et al. |
| 9,636,928 B2 | 5/2017 | Noell |
| 10,220,408 B2 | 3/2019 | Eng et al. |
| 10,226,944 B2 * | 3/2019 | Kerr ................... B25J 11/0075 |
| 10,710,378 B1 * | 7/2020 | Bullington ......... B41J 11/00218 |
| 11,045,836 B2 | 6/2021 | Arthur et al. |
| 2019/0176482 A1 | 6/2019 | Kerr et al. |
| 2020/0198338 A1 | 6/2020 | Riley et al. |
| 2021/0300061 A1 | 9/2021 | Boniface et al. |
| 2022/0097434 A1 | 3/2022 | Sugai et al. |

OTHER PUBLICATIONS

The future of aircraft printing is digital, Marabu Printing Inks, https://www.youtube.com/watch?v=dl8G10JqfEs, accessed Dec. 15, 2022.

* cited by examiner

MULTI-PRINTHEAD END EFFECTOR AND ASSOCIATED SYSTEM AND METHOD

FIELD

This disclosure relates generally to an end effector for printing ink on a surface, and more particularly to an end effector having multiple parallel printheads for printing ink on a surface and associated systems and methods.

BACKGROUND

In various commercial products, it is desirable to apply colorful visual images to a surface through the application of a pigmented formulation. The image may be applied to a surface by various methods, such as applying a paint or ink material to a surface using a brush or aerosol spray. However, applying images using a brush or aerosol spray is time-consuming and labor intensive, which can require multiple steps to apply multiple successively applied paint layers. Furthermore, applying images on complex surfaces is difficult and can require a series of masking operations followed by application of the paint or coating. These masking and painting operations are serially repeated until the surface is completed. Performing these processes on large areas with a variety of contoured surfaces requires a significant amount of time and resources.

SUMMARY

The subject matter of the present application has been developed in response to the present state of the art, and in particular, in response to the problems of and needs created or not yet fully solved by conventional printing apparatuses and methods. Generally, the subject matter of the present application has been developed to provide an end effector for printing on a surface, and associated systems and methods, that overcome at least some of the above-discussed shortcomings of prior art techniques.

Disclosed herein is an end effector for printing ink on a surface. The end effector comprises a main block comprising a back plate. The end effector also comprises a plurality of slice assemblies slidably coupled to the back plate. Each one of the plurality of slice assemblies comprise a printhead and a y-actuator. The y-actuator is selectively operable to extend and retract the printhead, parallel to a y-axis in first directions, and relative to the back plate. The end effector further comprises a plurality of z-actuators coupled to the back plate. Each one of the plurality of z-actuators is selectively operable to extend and retract a corresponding one of the plurality of slice assemblies, parallel to a z-axis in second directions, which is perpendicular to the y-axis, and relative to the back plate. The preceding subject matter of this paragraph characterizes example 1 of the present disclosure.

Each printhead is configured to extend and retract parallel to the y-axis, in the first directions, independently of any other one of the printheads. The preceding subject matter of this paragraph characterizes example 2 of the present disclosure, wherein example 2 also includes the subject matter according to example 1, above.

The plurality of slice assemblies are interconnected. Each one of the plurality of slice assemblies further comprises a front linear rail and a front bracket. The front bracket of each one of the plurality of slice assemblies is movably connected to the front linear rail of an adjacent one of the plurality of slice assemblies such that the front bracket slides along the front linear rail when one of the plurality of slice assemblies moves relative to the adjacent one of the plurality of slice assemblies parallel to the z-axis. The preceding subject matter of this paragraph characterizes example 3 of the present disclosure, wherein example 3 also includes the subject matter according to any of examples 1-2, above.

Each one of the plurality of slice assemblies is selectively movable, independent of any other one of the plurality of slice assemblies, along the corresponding front linear rail. The preceding subject matter of this paragraph characterizes example 4 of the present disclosure, wherein example 4 also includes the subject matter according to any of examples 1-3, above.

A maximum range of motion, parallel to the z-axis, of each one of the plurality of slice assemblies, relative to the back plate, is equal to a first distance. A maximum range of motion, parallel to the z-axis, of each one of the plurality of slice assemblies, relative to an adjacent one of the plurality of slice assemblies, is equal to a second distance. The second distance is less than the first distance. The preceding subject matter of this paragraph characterizes example 5 of the present disclosure, wherein example 5 also includes the subject matter according to any of examples 1-4, above.

Each one of the plurality of slice assemblies is configured to be co-movable with at least one other of the plurality of slice assemblies at any distance greater than the second distance and less than or equal to the first distance. The preceding subject matter of this paragraph characterizes example 6 of the present disclosure, wherein example 6 also includes the subject matter according to example 5, above.

The plurality of slice assemblies are positionable relative to the main block so that at least one of: the printheads of the plurality of slice assemblies are co-planar with a plane that is perpendicular to the second directions, all the printheads of the plurality of slice assemblies are staggered in the second directions, or at least two of the printheads of the plurality of slice assemblies are co-planar with the plane that is perpendicular to the second directions and at least two of the printheads of the plurality of slice assemblies are staggered in the second directions. The preceding subject matter of this paragraph characterizes example 7 of the present disclosure, wherein example 7 also includes the subject matter according to any of examples 1-6, above.

The plurality of slice assemblies are positionable relative to the main block so that at least one of: the printheads of the plurality of slice assemblies are co-planar with a plane that is perpendicular to the first directions, all the printheads of the plurality of slice assemblies are staggered in the first directions, or at least two of the printheads of the plurality of slice assemblies are co-planar with the plane that is perpendicular to the first directions and at least two of the printheads of the plurality of slice assemblies are staggered in the first directions. The preceding subject matter of this paragraph characterizes example 8 of the present disclosure, wherein example 8 also includes the subject matter according to any of examples 1-7, above.

The plurality of slice assemblies comprises at least six slice assemblies. The preceding subject matter of this paragraph characterizes example 9 of the present disclosure, wherein example 9 also includes the subject matter according to any of examples 1-8, above.

The printhead of each one of the plurality of slice assemblies is configured to print ink having a color. The color of ink printed by the printhead of each one of the plurality of slice assemblies is different than the color of ink printed by the printhead of any other one of the plurality of slice assemblies. The preceding subject matter of this paragraph characterizes example 10 of the present disclosure, wherein example 10 also includes the subject matter according to any of examples 1-9, above.

Each one of the plurality of slice assemblies further comprises a slice plate. Further, each one of the plurality of slice assemblies comprises an ink valve manifold. Additionally, each one of the plurality of slice assemblies comprises at least one tube extends from the ink valve manifold to the printhead. The ink valve manifold and the at least one tube are confined within a thickness of the slice plate. The ink valve manifold is configured to supply ink to the printhead. The preceding subject matter of this paragraph characterizes example 11 of the present disclosure, wherein example 11 also includes the subject matter according to any of examples 1-10, above.

Further disclosed herein is a system for printing ink on a surface. The system comprises a manipulator comprising a manipulator-attachment end, the manipulator-attachment end configured to be selectively movable relative to the surface. The system also comprises an end effector removably attachable to the manipulator-attachment end. The end effector comprises a main block comprising a back plate. The end effector also comprises a plurality of slice assemblies slidably coupled to the back plate. Each one of the plurality of slice assemblies comprises a printhead and a y-actuator. The y-actuator is selectively operable to extend and retract the printhead, parallel to a y-axis in first directions, and relative to the back plate. The end effector further comprises a plurality of z-actuators coupled to the back plate. Each one of the plurality of z-actuators is selectively operable to extend and retract a corresponding one of the plurality of slice assemblies, parallel to a z-axis in second directions, which is perpendicular to the y-axis, and relative to the back plate. The system further comprises a control system coupled to the end effector that is configured to receive data corresponding a location of the each one of the printheads and to control a position of the printheads, relative to the surface. The preceding subject matter of this paragraph characterizes example 12 of the present disclosure.

The manipulator-attachment end is configured to rotate the end effector in a pitch direction about the y-axis, a yaw direction about the z-axis, and a roll direction about an x-axis, perpendicular to the z-axis and the y-axis. The preceding subject matter of this paragraph characterizes example 13 of the present disclosure, wherein example 13 also includes the subject matter according to example 12, above.

Each y-actuator is coupled to a y-encoder, operable to provide a feedback signal to determine a position of the corresponding printhead, relative to the y-actuator, and a y-controller, operable to control movement of the y-actuator at least partially in response to the feedback signal from the y-encoder. Each z-actuator is coupled to a z-encoder, operable to provide a feedback signal to determine a position of the corresponding printhead, relative to the z-actuator, and a z-controller, operable to control movement of the z-actuator at least partially in response to the feedback signal from the z-encoder. The preceding subject matter of this paragraph characterizes example 14 of the present disclosure, wherein example 14 also includes the subject matter according to any of examples 12-13, above.

Each one of the plurality of slice assemblies further comprises a slice plate. Further, each one of the plurality of slice assemblies comprises an ink valve manifold. Additionally, each one of the plurality of slice assemblies comprises at least one tube extends from the ink valve manifold to the printhead. The ink valve manifold and the at least one tube are confined within a thickness of the slice plate. The ink valve manifold is configured to supply ink to the printhead. The preceding subject matter of this paragraph characterizes example 15 of the present disclosure, wherein example 15 also includes the subject matter according to any of examples 12-14, above.

The end effector further comprises a leading outer frame, fixed relative to the back plate, and coupled to a first one of the plurality of slice assemblies. Additionally, the end effector further comprises at least one distance sensor coupled to the leading outer frame and operable to determine a distance between the leading outer frame and the surface. The preceding subject matter of this paragraph characterizes example 16 of the present disclosure, wherein example 16 also includes the subject matter according to any of examples 12-15, above.

The end effector further comprises a trailing outer frame, fixed relative to the back plate, and coupled to a last one of the plurality of slice assemblies. The trailing outer frame is spaced apart from the leading outer frame to accommodate the plurality of slice assemblies therebetween. Additionally, the end effector further comprises at least one distance sensor coupled to the trailing outer frame and operable to determine a distance between the trailing outer frame and the surface. The preceding subject matter of this paragraph characterizes example 17 of the present disclosure, wherein example 17 also includes the subject matter according to example 16, above.

Further disclosed herein is a method of printing ink on a surface. The method comprises a step of positioning an end effector relative to the surface. The end effector comprises a plurality of slice assemblies each comprising a slice plate slidably coupled to a back plate of the end effector. Each one of the plurality of slice assemblies comprises a printhead slidable coupled to the slice plate. The method also comprises a step of receiving location data for each printhead and each one of the plurality of slice assemblies. The method further comprises at least one of in response to the location data for each printhead of the plurality of slice assemblies, adjusting a position of at least one printhead, relative to a corresponding one of the slice plates, in a first direction so that the at least one printhead is a desired distance away from the surface, and in response to the location data for each one of the plurality of slice assemblies, adjusting a position of at least one of the plurality of slice assemblies, relative to the back plate, in a second direction, perpendicular to the first direction, so that the at least one printhead of the plurality of slice assemblies is the desired distance away from the surface. The method additionally comprises a step of moving the end effector along the surface. Further, the method comprises a step of printing ink, via at least one of the printheads, on the surface as the end effector is moved along the surface. The preceding subject matter of this paragraph characterizes example 18 of the present disclosure.

The method additionally comprises the step of adjusting the position of the at least one of the plurality of slice assemblies to enable printing within an angle formed between a feature on the surface and the surface, as the end effector is moved along the surface. The preceding subject matter of this paragraph characterizes example 19 of the present disclosure, wherein example 19 also includes the subject matter according to example 18, above.

Additionally, the method comprises the step of adjusting the position of the at least one printhead to enable printing around an obstruction on the surface, as the end effector is moved along the surface. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of an end effector, and associated systems and methods, for printing ink on a surface. The following provides some features of at least some examples of the end effector. The end effector includes multiple slice assemblies that are parallel to each other and arranged in a horizontally stacked manner, relative to the surface on which the end effector will print ink (e.g., horizontal being defined as generally parallel to the surface. Each one of the multiple slice assemblies includes a printhead that is configured to print ink on the surface. The end effector has printheads that each print a different color, such that the end effector can print multiple colors in a single pass of the end effector, which helps to reduce the time and labor necessary to print multiple colors of ink to a surface. The end effector, disclosed herein, has multiple axes of movement, which allows the end effector to be adjustable and maneuverable in order to access and print on complex surfaces with obstructions and other complex features. The end effector can be attachable to a manipulator (e.g., a robot), which enables the end effector to be maneuvered about the surface. Additionally, each one of the individual slice assemblies, as well as each individual printhead, is adjustable. Accordingly, each one of the printheads can be adjusted to print on a surface with obstructions or hard to access areas, such as small spaces or acute angles on the surface. For example, the end effector can be useful for printing close to and around an obstruction on the surface, as well as printing within an acute or closed angle, all while maintaining a constant distance between the printheads of the end effector and the surface.

One non-limiting use of the end effector for is printing a decorative livery coating on the surface of an aircraft. The decorative livery coating provides a decorative design on the surface of the aircraft, which helps to identify and distinguish one aircraft from another.

Figure 1:
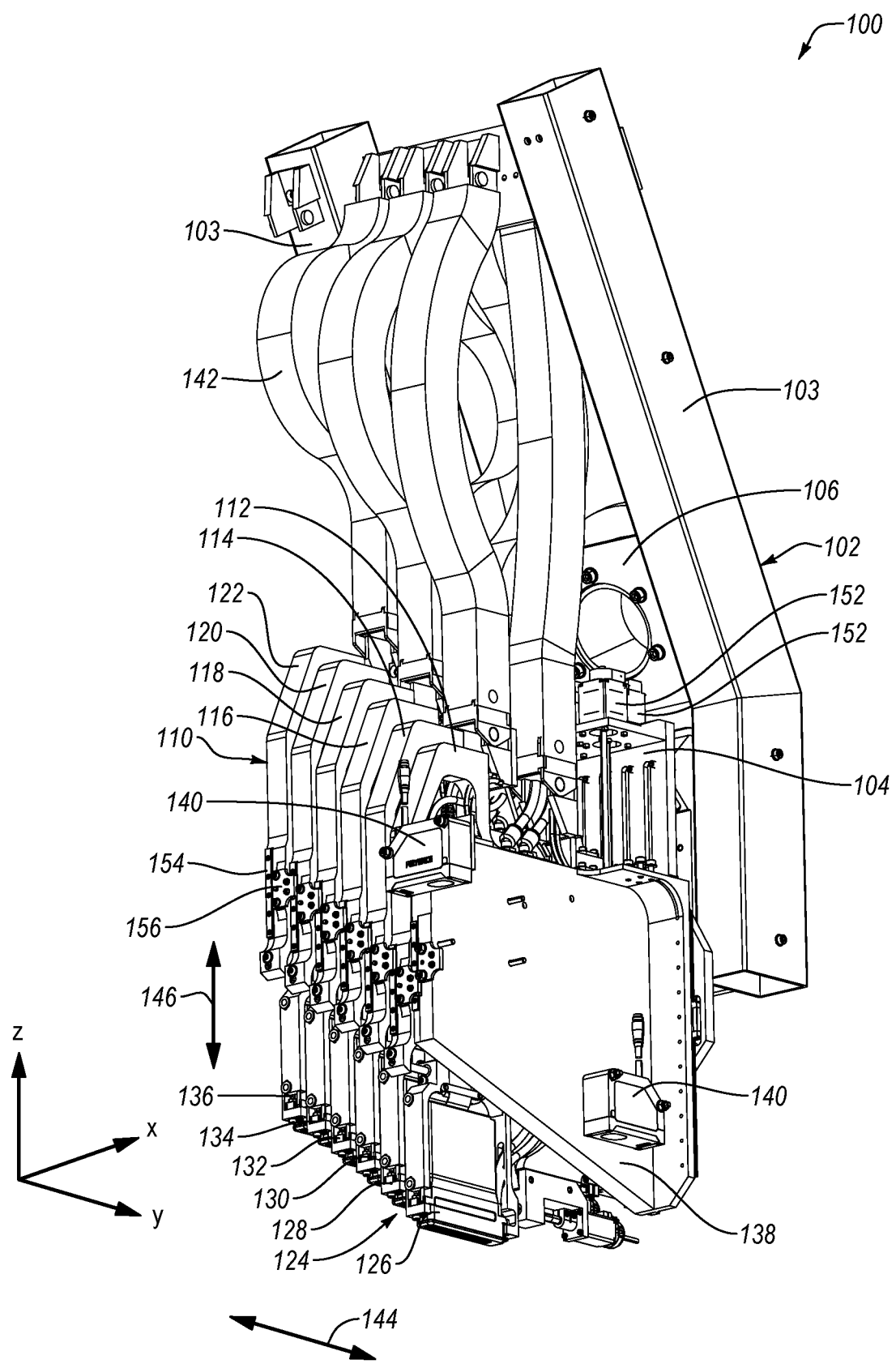
FIG. 1 is a schematic perspective view of an end effector, according to one or more examples of the present disclosure.
Figure 2:
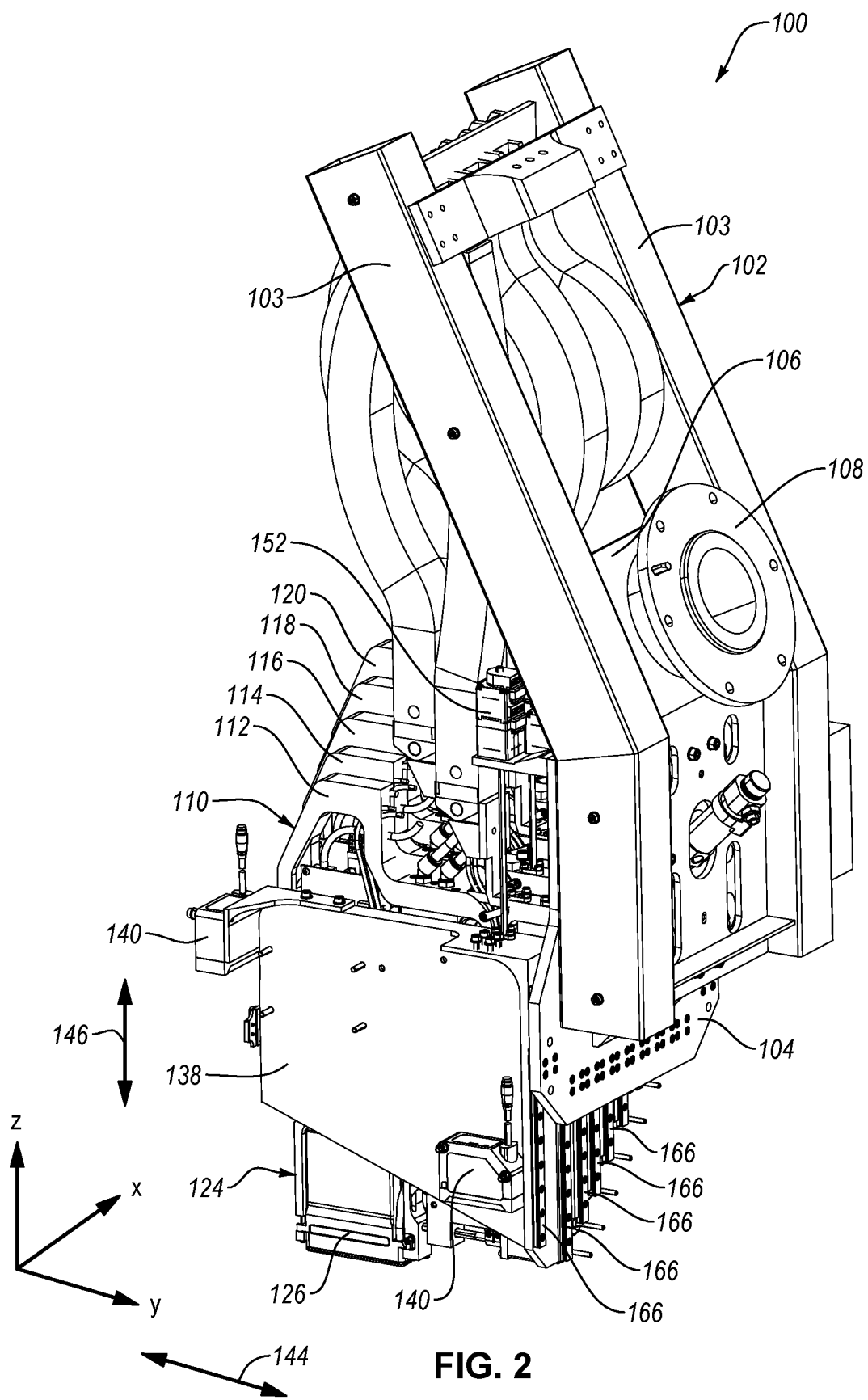
FIG. 2 is a schematic perspective view of the end effector of FIG. 1, according to one or more examples of the present disclosure.

Referring to FIGS. 1 and 2, one example of an end effector 100 is shown. The end effector 100 includes a main block 102 that is configured to be attachable to a manipulator, as well as to provide support for multiple printheads 124. The main block 102 includes a mounting plate 106, with a mounting adaptor 108, and a back plate 104. In some examples, the main block 102 includes two arms 103. The mounting plate 106 and the back plate 104 are fixed to the two arms 103, such as attached to and extending between the two arms 103. The mounting plate 106 and the back plate 104 can be distinct parts. However, in other examples, the mounting plate 106 and the back plate 104 are integrally formed such that the mounting plate 106 and back plate 104 have a one-piece, unitary, and seamless construction. The end effector 100 also includes a plurality of slice assemblies 110. Additionally, the end effector 100 includes a set of mechanical elements 142 (e.g., e-chains), which are coupled to the main block 102 and a plurality of slice assemblies 110. The mechanical elements 142 help support movement of the plurality of slice assemblies 110, relative to the back plate 104, as well as guide and/or protect cables and/or tubes of the end effector 100 from wear and tear, friction, stress, entanglement, and/or heat.

The plurality of slice assemblies 110 are movably (e.g., slidably) coupled to the back plate 104 via a plurality of back-connection rails 166 each associated with a corresponding one of the slice assemblies 110. Each one of the back-connection rails 166 is non-movably fixed to a corresponding one of the slice assemblies 110 and is configured to be coupled to and slide along the back plate 104 via a corresponding one of multiple brackets (e.g., tracks or other slide-facilitating couplings) fixed to the back plate 104. The end effector 100 further includes a plurality of z-actuators 152 coupled to the back plate 104. Each one of the z-actuators is selectively operable to move a corresponding at least one of the plurality of slice assemblies 110, relative to the back plate 104. When selectively operated, the plurality of z-actuators 152 selectively extend or retract (e.g., lower or raise) the corresponding one of the plurality of slice assemblies 110, relative to the back plate 104, parallel to a z-axis in second directions 146. That is, the slice assembly 110 is alternatively moved towards or away (i.e., vertically) from a surface, when the z-actuator 152 is actuated and while the end effector 100 is in use on the surface. The z-axis is parallel to the back plate 104. Accordingly, the plurality of z-actuators 152 moves the slice assemblies 110 parallel to the z-axis. Accordingly, the z-actuators 152 are configured to independently adjust the locations of the slice assemblies 110 to conform to and follow a variety of surface geometries (i.e., convex/concave surfaces) encountered along a complex surface. As used herein, a direction is parallel to an axis when the direction defines a direction vector that is either collinear with the axis, or side-by-side with the axis so that a distance between the direction vector and the axis is continuously the same.

The end effector 100 has at least two slice assemblies 110. In some examples, the end effector 100 has at least six slice assemblies 110. The slice assemblies 110 are arranged parallel to each other and in a horizontally stacked manner (e.g., stacked relative to each other in a direction parallel to the x-axis). That is, when the end effector 100 is in use printing on a surface, the plurality of slice assemblies 110 are horizontally stacked or overlap each other in the horizontal direction, relative to the surface on which the end effector 100 is printing. In one example, the end effector 100 has six slice assemblies 110, as shown in FIG. 1. Although shown with six slice assemblies 110, in other examples, the end effector 100 can have more or less than six slice assemblies.

Each one of the plurality of slice assemblies 110 includes one printhead 124 that is configured to print ink. For example, a first slice assembly 112 has a first printhead 126, and is configured to be a leading printhead, such that the first printhead 126 is potentially first to print ink on a surface in a given pass along the surface in a first direction (it is noted that the first printhead 126 is a trailing printhead when the pass is along the surface in a second direction opposite the first direction). A second slice assembly 114, directly adjacent the first slice assembly 112, has a second printhead 128, and is potentially second to print ink on the surface in the given pass along the surface. A third slice assembly 116, directly adjacent the second slice assembly 114, has a third printhead 130, and is potentially third to print ink on the surface in the given pass along the surface. A fourth slice assembly 118 is directly adjacent the third slice assembly 116, has a fourth printhead 132, and is potentially fourth to print ink on the surface in the given pass along the surface. A fifth slice assembly 120 is directly adjacent the fourth slice assembly 118, has a fifth printhead 134, and is potentially fifth to print ink on the surface in the given pass along the surface. A last slice assembly 122 is directly adjacent the fifth printhead 134, has a last printhead 136, and is potentially the final printhead to print ink on the surface in the given pass along the surface (it is noted that the last printhead 136 is a leading printhead when the pass is along the surface in the second direction opposite the first direction). It is recognized that for some printing applications not every one of the printheads will print ink onto the surface.

In some examples, each one of the printheads 124 is or includes an inkjet head, which can be a piezo jet, thermal jet, continuous jet, and/or valve jet printhead. Each one of the printheads 124 is configured to print ink on a surface. As used herein, ink can be any pigmented formulation which can be applied to a surface, such as an ink, water-based paint, oil-based paint, primer, coatings, varnish, etc. Each one of the printheads 124 is configured to print ink having a color (which includes white or black). In some examples, each one of the printheads 124 of the end effector 100 prints ink having different color than the ink printed by any other one of the printheads 124 of the end effector 100. Various color and/or print systems can be used for printing on the surface. For example, CMYK, RGB or expanded color systems can be used. It is possible for the end effector 100 to print single-color, multi-color images, chromatic images, grey-stage images, monochrome, binary images, etc. In other examples, at least two printheads 124 of the end effector 100 print ink having the same color. For example, a first printhead may print a first coat of a color of ink and a second printhead may print a second coat of the same color of ink.

Figure 3A:
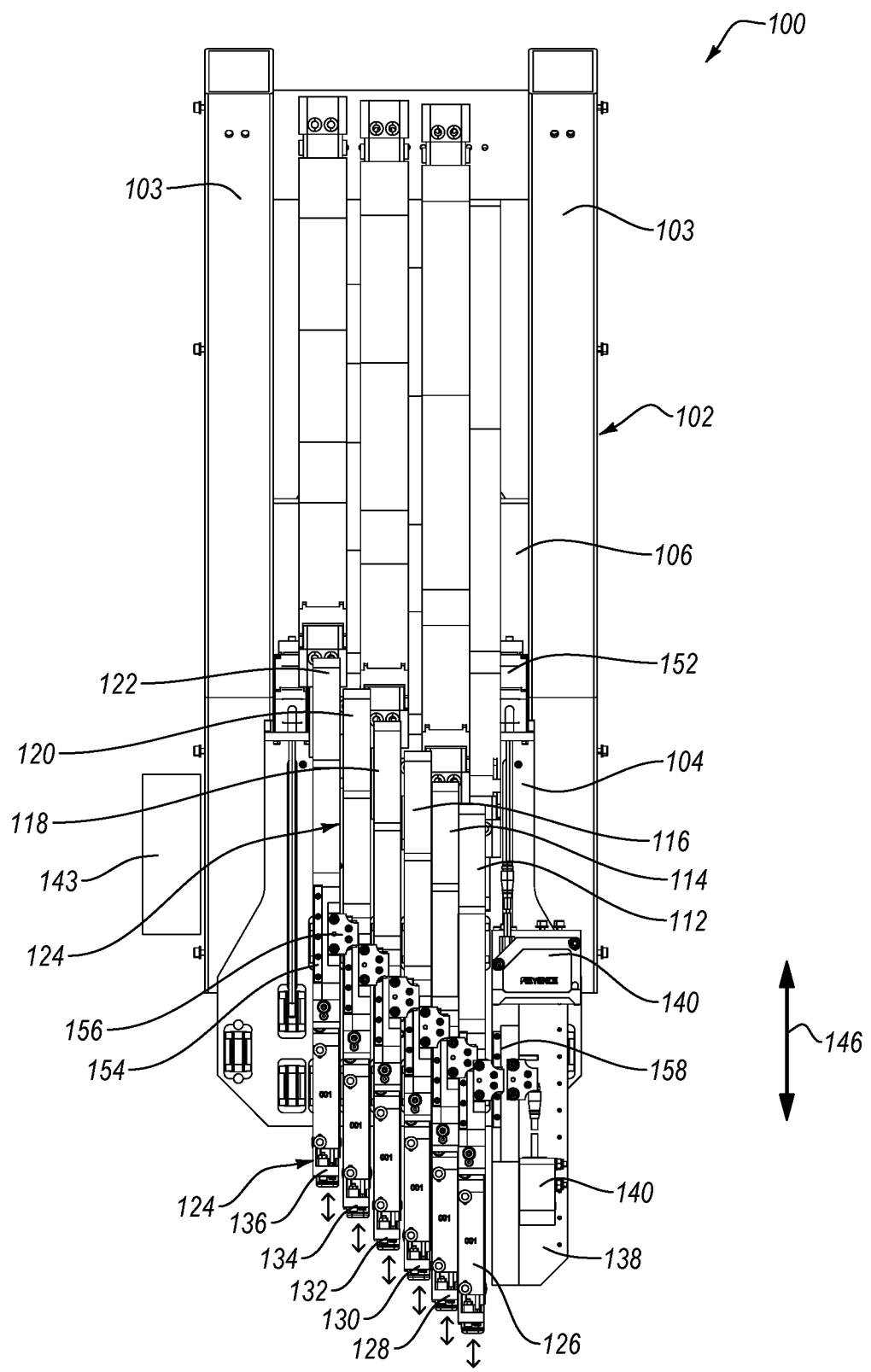
FIG. 3A is a schematic front elevation view of an end effector, with a leading outer frame, according to one or more examples of the present disclosure.
Figure 4:
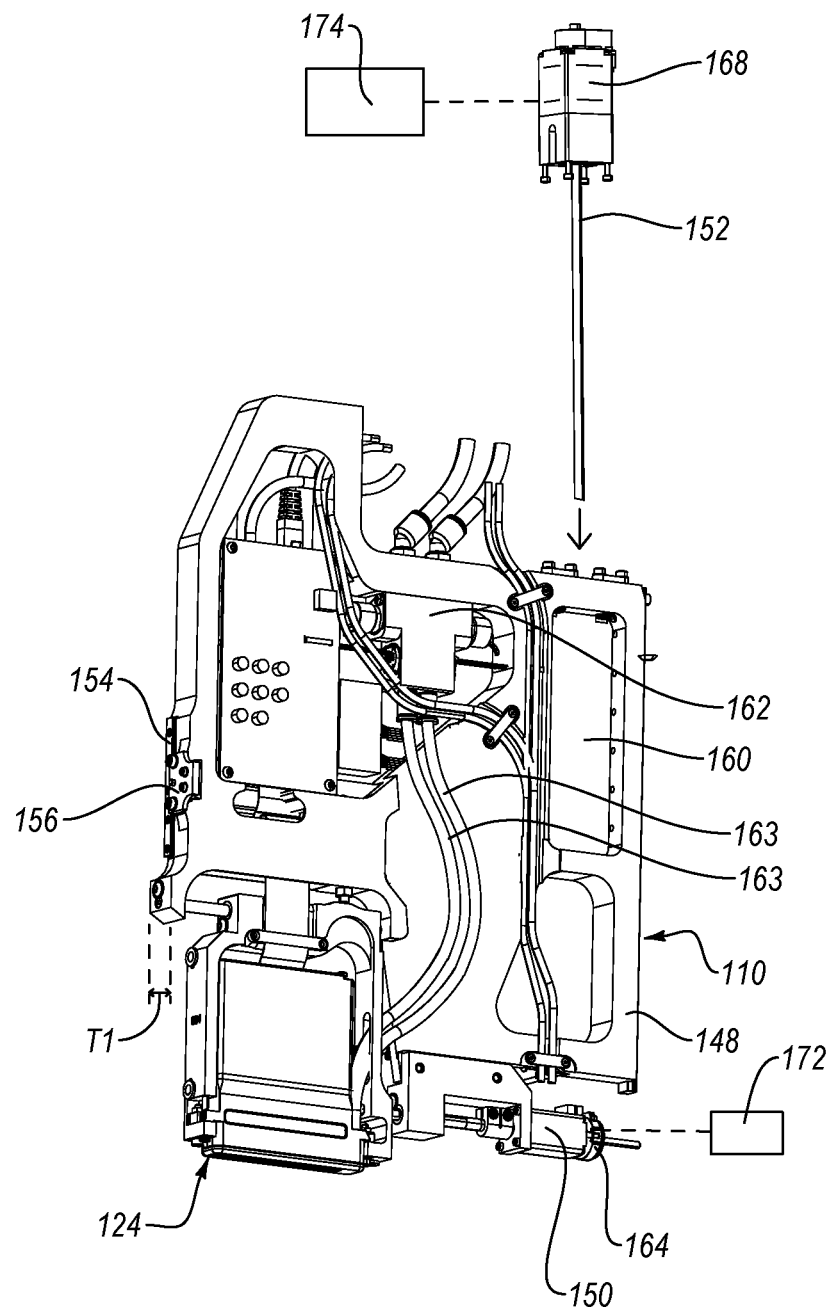
FIG. 4 is a schematic perspective view of a slice assembly and a z-actuator of an end effector, according to one or more examples of the present disclosure.

The plurality of slice assemblies 110 are interconnected. That is, each slice assembly 110 is connected to at least one other adjacent slice assembly 110, such that the plurality of slice assemblies 110 are interconnected in the stacked horizontal manner. For example, the first slice assembly 112 is connected to the second slice assembly 114, which is connected to the third slice assembly 116, and continuing in this manner to the last slice assembly 122. As shown in FIGS. 3A and 4, each one of the plurality of slice assemblies 110 includes a front linear rail 154 and a front bracket 156. Slice assemblies 110 are connected to adjacent slice assemblies by movably interconnecting the front bracket 156 of each slice assembly 110 to the front linear rail 154 of an adjacent one of the plurality of slice assemblies 110. When one of the plurality of slice assemblies 110 moves relative to the adjacent one of the plurality of slice assemblies 110, the front bracket 156 slides along the front linear rail 154 of the adjacent slice assembly, which is parallel to the z-axis. For example, the front bracket 156 of the second slice assembly 114 is movably connected to the front linear rail 154 of the third slice assembly 116. Likewise, the front bracket 156 of the third slice assembly 116 is movably connected to the front linear rail 154 of the fourth slice assembly 118. The front bracket 156 of the first slice assembly 112 is movably connected to the front linear rail 158 of a leading outer frame 138, rather than an adjacent slice assembly, and slides along the front linear rail 158 of the leading outer frame 138 in the same manner.

Figure 9:
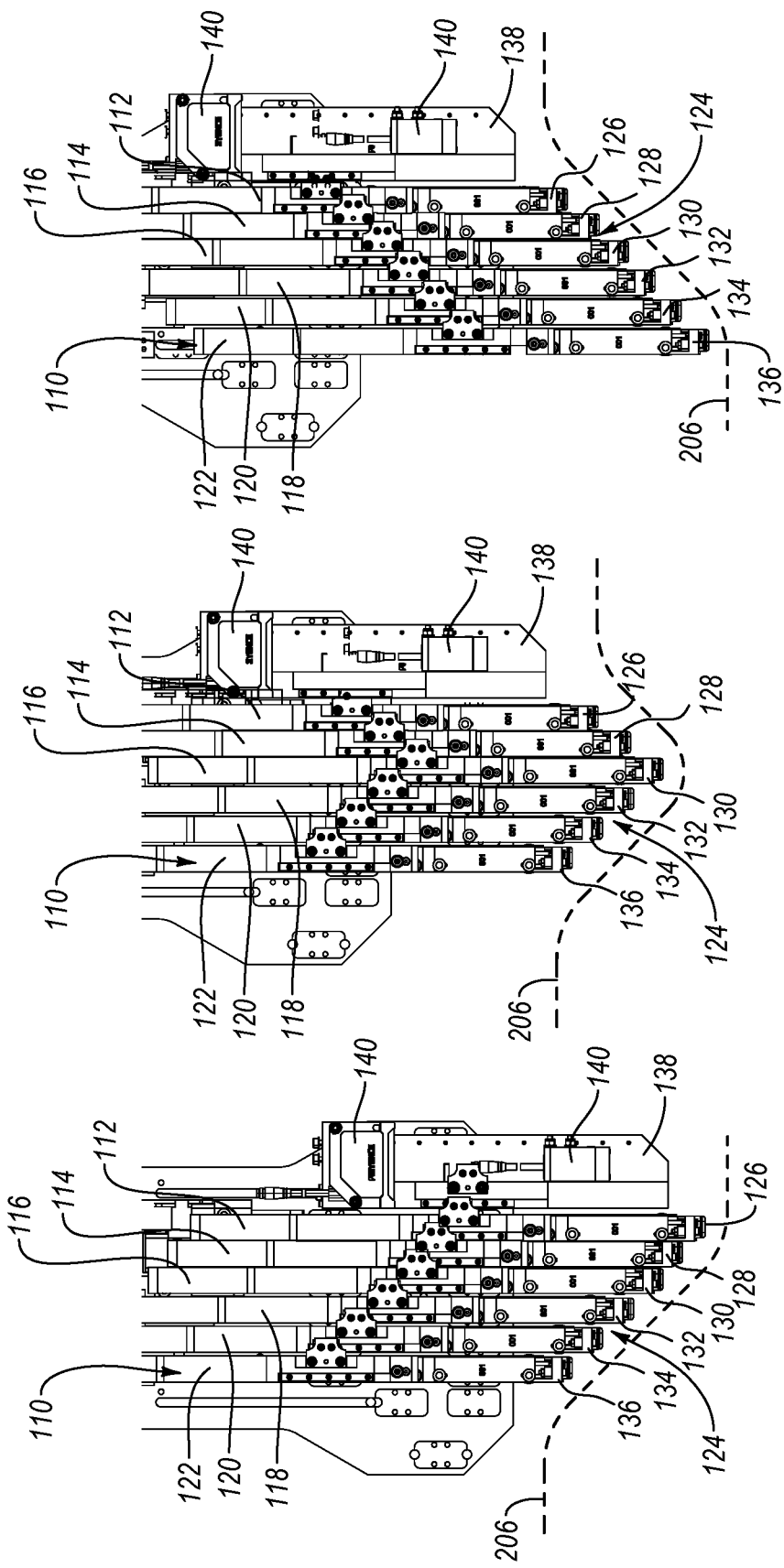
FIG. 9A is a schematic front elevation view of a portion of an end effector, shown with a plurality of slice assemblies staggered in a second direction in a cascading upward manner, according to one or more examples of the present disclosure.
FIG. 9B is a schematic front elevation view of the portion of the end effector of FIG. 9A, shown with the plurality of slice assemblies staggered in the second direction into a wedge shape, according to one or more examples of the present disclosure.
FIG. 9C is a schematic front elevation view of the portion of the end effector of FIG. 9A, shown with the plurality of slice assemblies staggered in the second direction in a cascading downward manner, according to one or more examples of the present disclosure.

A front elevation view of the end effector is shown in FIG. 3A. The plurality of slice assemblies 110 are independently positionable in various vertical positions relative to the main block 102. As shown, in some examples, all printheads 126-136 are positionable such that the printheads 126-136 are staggered in the second directions 146. That is, all printheads 126-136 are vertically offset from each other printhead (where vertical is defined parallel to the z-axis). For example, the printheads 126-136 can be staggered in any manner, including a cascading upward manner, such as shown in FIG. 9A, or a cascading downward manner, such as shown in FIG. 9C. Staggering the printheads 126-136 may be useful when printing on a complex surface 206, such as printing over an angled surface.

In other examples, the printheads 124 of the plurality of slice assemblies 110 are co-planar with a plane that is perpendicular to the second directions 146. In other words, the printheads 124 are all horizontally aligned with each other. Aligning each printhead 124 may be helpful when the printheads 124 are printing ink on a flat surface.

In yet other examples, at least two of the printheads 124 of the plurality of slice assemblies 110 are co-planar with the plane that is perpendicular to the second directions 146 and at least two of the printheads 124 of the plurality of slice assemblies 110 are staggered in the second directions 146. For example, the printheads 126-136 can be arranged in a V-shape or wedge shape, such as shown in FIG. 9B. The first printhead 126 is co-planar with the fifth printhead 134, likewise the second printhead 128 is co-planar with the fourth printhead 132. The third printhead 130 and the printhead 136 are vertically staggered or offset from all others of the printheads.

Referring again to FIG. 2, the end effector 100 further includes a leading outer frame 138. In some examples, the leading outer frame 138 is movably fixed to the back plate 104, such that the leading outer frame 138 is movable, via a corresponding z-actuator 152, relative to the back plate 104, parallel to the z-axis in second directions 146. In other examples the leading outer frame 138 is non-movably fixed to the back plate 104. The leading outer frame 138 is coupled to the first slice assembly 112 of the plurality of slice assemblies 110. At least one distance sensor 140 is coupled to the leading outer frame 138. The distance sensor 140 is operable to determine a distance between the leading outer frame 138 and the surface 206. Moreover, the information received from the distance sensor 140 can be used to make real-time adjustments to the position of the end effector 100 according to various geometries of the surface.

Figure 3B:
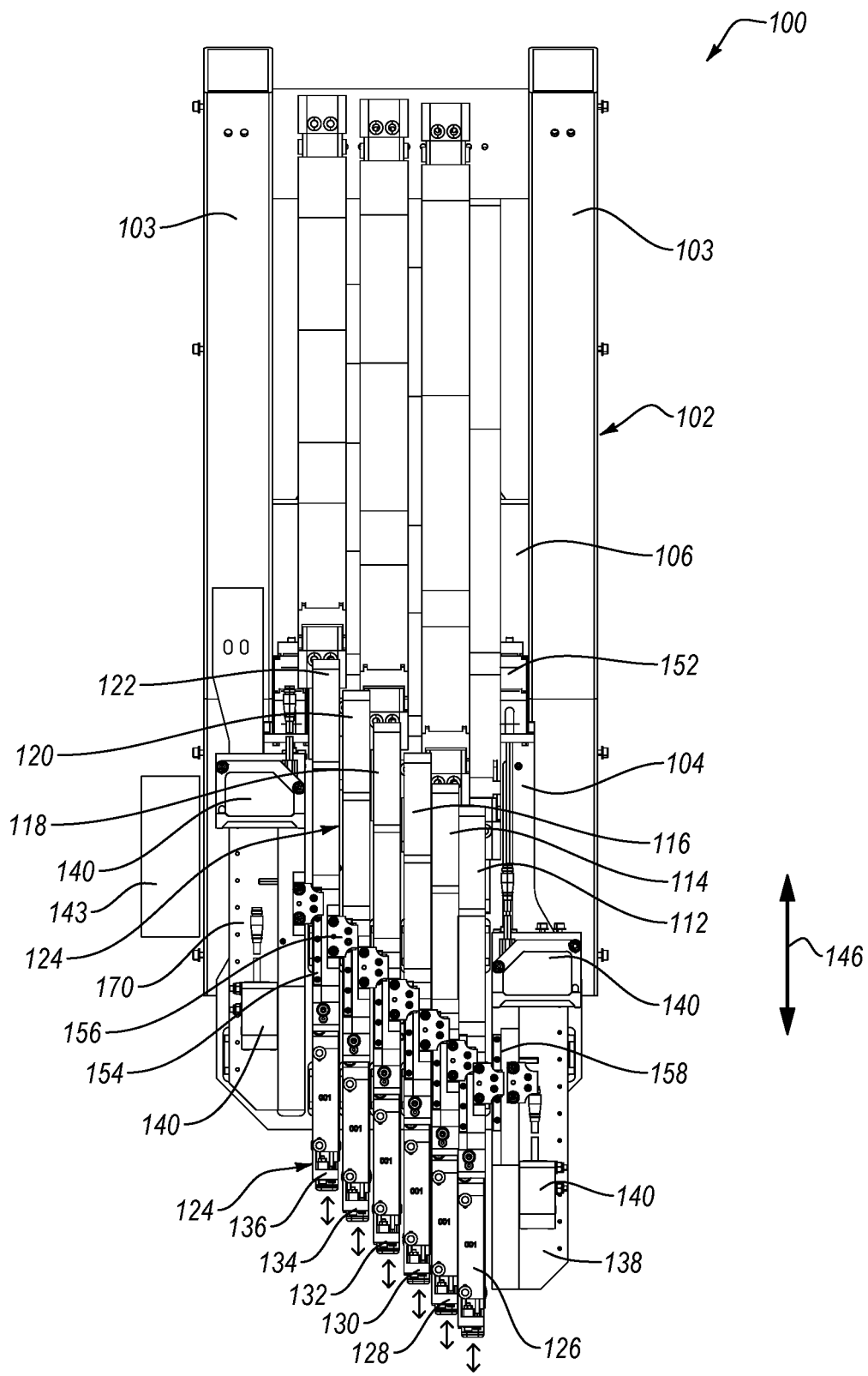
FIG. 3B is a schematic front elevation view of an end effector, with a leading outer frame and a trailing outer frame, according to one or more examples of the present disclosure.

In some examples, the end effector 100 also comprises a trailing outer frame 170, such as shown in FIG. 3B. The trailing outer frame 170 is spaced apart from the leading outer frame 138, such that the plurality of slice assemblies 110 are interposed and effectively sandwiched between the leading outer frame 138 and the trialing outer frame 170. Similar to the leading outer frame 138, the trailing outer frame 170 may be movably fixed or non-movably fixed to the back plate 104. The trailing outer frame 170 is coupled to the last slice assembly 122. In the case that the trailing outer frame 170 is movably fixed to the back plate 104, the front bracket 156 of the trailing outer frame 170 slides along the front linear rail 154 of the last slice assembly 122. Although the trailing outer frame 170 trails the leading outer frame 138 when the end effector 100 is moving in one direction, the trailing outer frame 170 can lead the leading outer frame 138 when the end effector 100 moves in the opposite direction.

As previously disclosed, the plurality of slice assemblies 110 are independently positionable in various positions relative to each other via the corresponding z-actuators 152. According to some examples, the movement of each one of the plurality of slice assemblies 110, relative to an adjacent slice assembly 110, is limited. That is, as the corresponding z-actuator 152 is actuated, each one of the slice assemblies can move independently of any other of the plurality of slice assemblies 110, along only a length of the corresponding front linear rail 154. For example, the z-actuator 152 corresponding to the first slice assembly 112 can be actuated to move the first slice assembly 112 along the length the front linear rail 154 without moving any other slice assembly 110 or the leading outer frame 138. Each one of the plurality of slice assemblies 110 is also configured to be co-movable with at least one other of the plurality of slice assemblies 110. That is, as the corresponding z-actuator 152 is actuated, a slice assembly can co-move with at least one other slice assembly, along the corresponding back-connection rail 166 (see, e.g., FIG. 2). A maximum range of motion of each one of the plurality of slice assemblies 110, parallel to the z-axis, relative to the back plate 104, is equal to a first distance. In some examples, the first distance is equal to the length of the corresponding back-connection rail 166. A maximum range of motion of each one of the plurality of slice assemblies 110, parallel to the z-axis, and relative to the adjacent one of the plurality of slice assemblies 110, is equal to a second distance. In some examples, the second distance is the length of the corresponding front linear rail 154. The second distance is less than the first distance.

Figure 5:
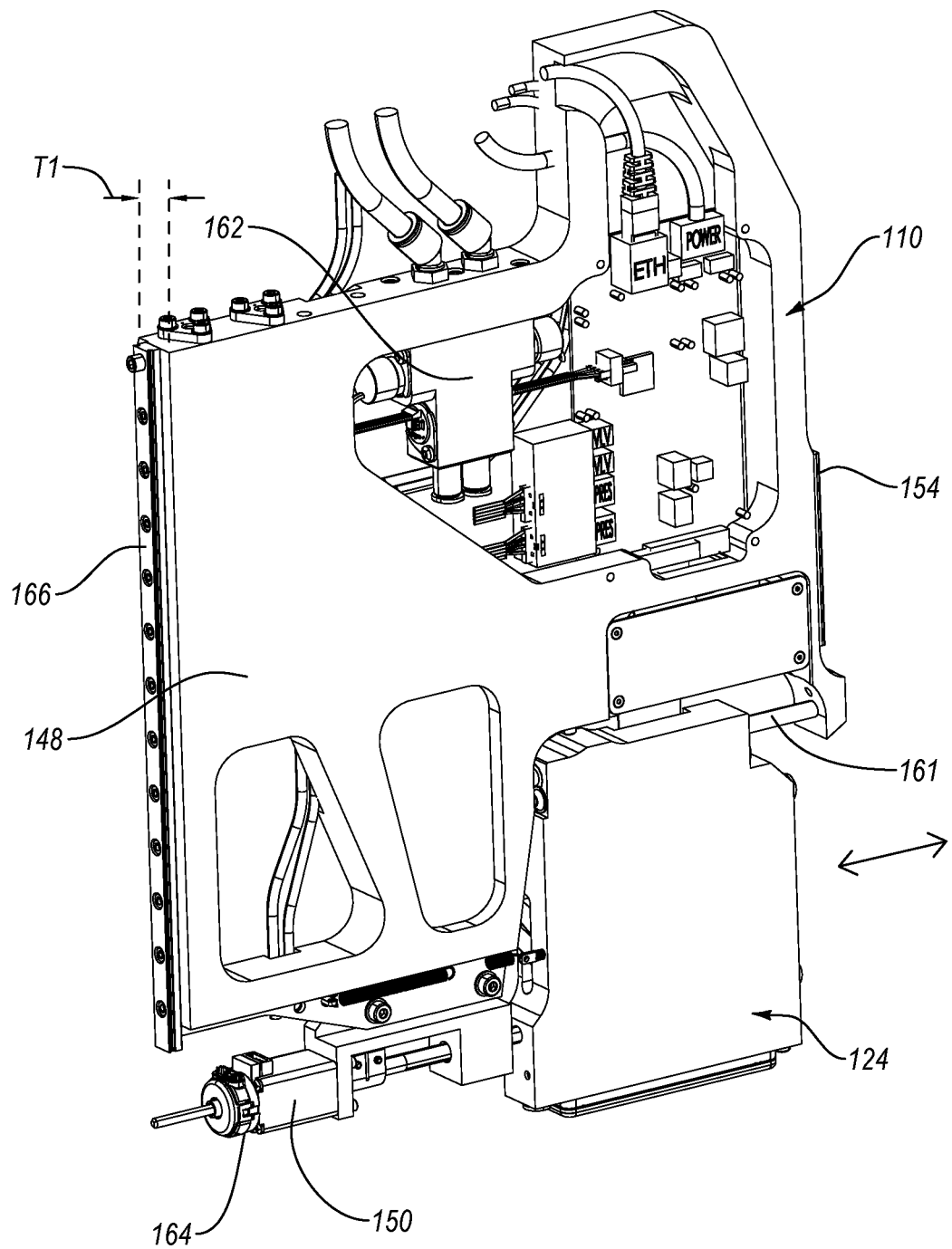
FIG. 5 is a schematic perspective view of a slice assembly of an end effector, according to another one or more examples of the present disclosure.

A slice assembly 110, according to one example, is shown in FIGS. 4 and 5. The slice assembly 110 is representative of any one of the slice assemblies 112-122 of FIG. 1. The slice assembly includes a slice plate 148, which provides the structure and support for all other components of the slice assembly. The printhead 124 is coupled to the slice plate 148, via a rod 161. The printhead 124 configured to selectively slide along the rod 161 when a y-actuator 150 of the slice assembly 110 is actuated. The y-actuator 150 is selectively operable to extend and retract the printhead 124, relative to the back plate 104, in first directions 144 parallel to a y-axis. In other words, the y-actuator 150 is configured to move a corresponding printhead 124, forward and back (i.e., horizontally), relative to a surface, when the end effector 100 is moving along the surface. Each printhead 124 is configured to extend and retract in the first direction 144 parallel to the y-axis, independently of any other one of the printheads 124. Accordingly, the y-actuator 150 is configured to adjust the location of the corresponding printhead 124 to conform and follow a variety of surface geometries (i.e., convex/concave surfaces) encountered along a complex surface.

Figure 11:
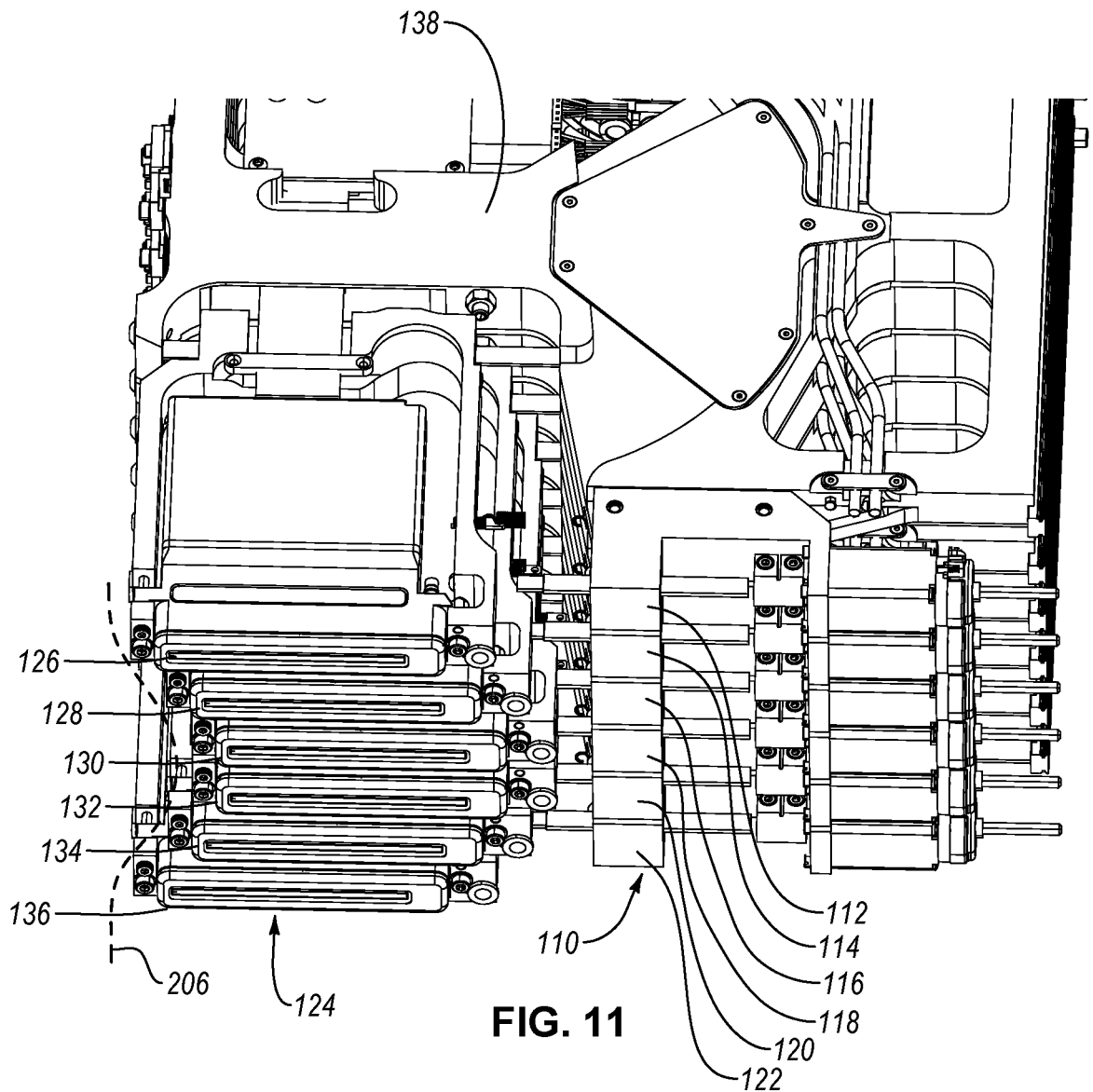
FIG. 11 is a schematic perspective view of a portion of an end effector with printheads staggered in a first direction, according to one or more examples of the present disclosure.

The printhead 124 is positionable in any of various horizontal positions relative to the main block 102 and relative to the slice plate 148. In some examples, all printheads 126-136 (see, e.g., FIG. 1) are co-planar with a plane that is perpendicular to the first directions 144. In other examples, all the printheads 126-136 are staggered in the first directions 144. Staggering the printheads 126-136 may be useful when printing on a complex surface, such as when printing on or around an obstruction on the surface. In yet other examples, at least two of the printheads are co-planar with the plane that is perpendicular to the first directions and at least two of the printheads are staggered in the first directions 144. For example, as shown in FIG. 11, the third printhead 130 is co-planar with the fifth printhead 134, likewise the second printhead 128 is co-planar with the last printhead 136. The fourth printhead 132 and the first printhead 126 are horizontally staggered from the remaining printheads.

The slice assembly 110 further includes an ink valve manifold 162 and at least one tube 163 extending from the ink valve manifold 162 to the printhead 124. The ink valve manifold 162 and the at least one tube 163 are confined within the thickness T1 of the slice plate 148. That is, the ink valve manifold 162 and any attached tubes do not extend beyond the thickness T1 of the slice plate 148. This allows the slice assembly 110 to be moved, via the z-actuator 152 without the ink valve manifold 162 interfering with the movement any other one of the plurality of slice assemblies 110. In some examples, the slice plate 148 contains slots and/or openings in which the tubes and/or cables are configured to be positioned within to keep the tubes and/or cable confined within the thickness T1 of the slice plate 148.

The z-actuator 152 is selectively operable to extend and retract the slice assembly 110. In some examples, the slice plate 148 may have a channel 160 in which the z-actuator 152 is configured to be partially located within in order to extend and retract the slice assembly 110.

The y-actuator 150 and z-actuator 152 can be any of various actuator devices that are capable of moving the printhead 124 or slice assembly 110, respectively, in a linear direction. In one example, the y-actuator 150 and z-actuator 152 are linear actuators, such as a stepper motor with a lead screw with produces motion along a linear path. Each y-actuator 150 is coupled to a y-encoder 164 that is operable to provide a feedback signal used to determine a position of the corresponding printhead 124, relative to the y-actuator 150. Additionally, a y-controller 172 is operable to control the movement of the y-actuator 150, at least partially in response to the feedback signal from the y-encoder 164. In some examples, the y-controller 172 may control the speed of the y-actuator 150. Likewise, each z-actuator 152 is coupled to a z-encoder 168 that is operable to provide a feedback signal used to determine a position of the corresponding printhead 124, relative to the z-actuator 152. A z-controller 174 is operable to control the movement of the z-actuator 152, at least partially in response to the feedback signal from the z-encoder 168. Information received from the y-encoder 164 and the z-encoder 168 can be used to make real-time adjustments to the position of the corresponding printhead 124 according to various surface geometries of the surface.

Figure 6:
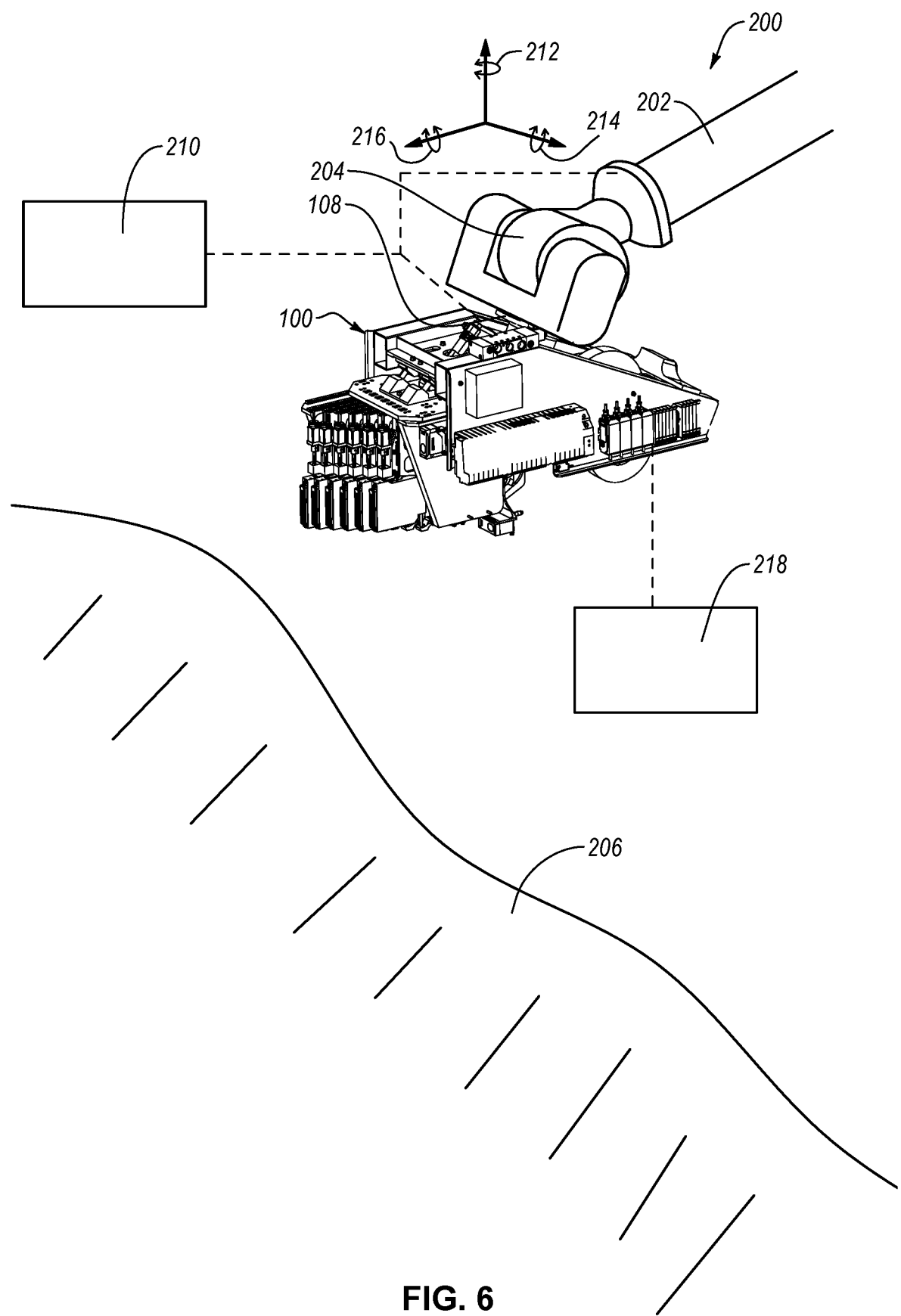
FIG. 6 is a schematic perspective view of a system for printing on a surface, according to one or more examples of the present disclosure.

A system 200 for printing on a surface 206 is shown in FIG. 6. The system 200 includes a manipulator, in some examples, having a manipulator arm 202 with a manipulator-attachment end 204, the end effector 100 removably attachable to the manipulator-attachment end 204. The manipulator can be any device with sufficient degrees of freedom to position the end effector 100, relative to the surface 206, in such a way that ink can be printed onto the surface 206. In some examples, the manipulator is a robot. The manipulator-attachment end 204 is configured to be selectively movable relative to the surface 206. The manipulator-attachment end 204 is configured to move linearly, relative to the surface 206, such that the manipulator-attachment end 204 can move parallel to at least one of the x-axis and the y-axis. The manipulator-attachment end 204 is further configured to be rotatable relative to the surface 206, and in some examples, the manipulator-attachment end 204 is configured to be rotatable in three degrees of freedom. Accordingly, when attached, the manipulator-attachment end 204 can rotate the end effector 100 in a pitch direction 216 about the y-axis, in a yaw direction 212 about the z-axis, and in a roll direction 214 about an x-axis, perpendicular to the z-axis and the y-axis.

The system further includes a control system 210 communicatively coupled to the end effector 100 that is configured to receive data corresponding to a location of each one of the printheads 124, relative to the surface 206. In some examples, the y-encoder 164 together with the z-encoder 168 may provide that data corresponding to the location of each one of the printheads 124. That is, the y-encoder 164 provides the location data of the printhead 124, parallel to the y-axis, and the z-encoder 168 provides the location data of the printhead 124, parallel to the z-axis. Additionally, in some examples, the control system 210 is configured to receive data corresponding to a location of the end effector 100, relative to the surface 206. Using the distance sensor 140, coupled to the leading outer frame 138, the location of the end effector 100 parallel to the x-axis, which is perpendicular to the y-axis, can be determined. Additionally, or alternatively, the distance sensors 140, coupled to the trailing outer frame 170, can be used to determine the location of the end effector 100 parallel to the x-axis. The control system 210 is additionally communicatively coupled with the manipulator arms 202 to control the movement of the manipulator arm 202 relative to the surface 206.

The control system 210 is further configured to control the position of the printheads 124. In some examples, the y-controller 172 together with the z-controller 174 are configured to control the position of the printheads 124, by actuating the y-actuator 150 and the z-actuator 152, respectively. The control system 210 further controls the position and rotation of the manipulator-attachment end 204. The control system 210 is described as being communicatively connected with other components. Communicatively connected refers to any type of communication and/or connection between the components that allows the component to pass and/or receive signals and/or information from another component. The communication may be along any signal path, whether a wired or a wireless connection. The control system 210 may include, or be part of, a computing device that may include one or more processors, memory, and one or more communication interfaces, such as the input/output rack 143 shown in FIG. 2.

The system 200 includes an ink delivery system 218 configured to deliver ink, via a plurality of tubes to the ink valve manifold 162 of each one of the plurality of slice assemblies 110. The ink delivery system 218 may be directly coupled to the end effector 100 or indirectly coupled to the end effector 100.

Figure 7:
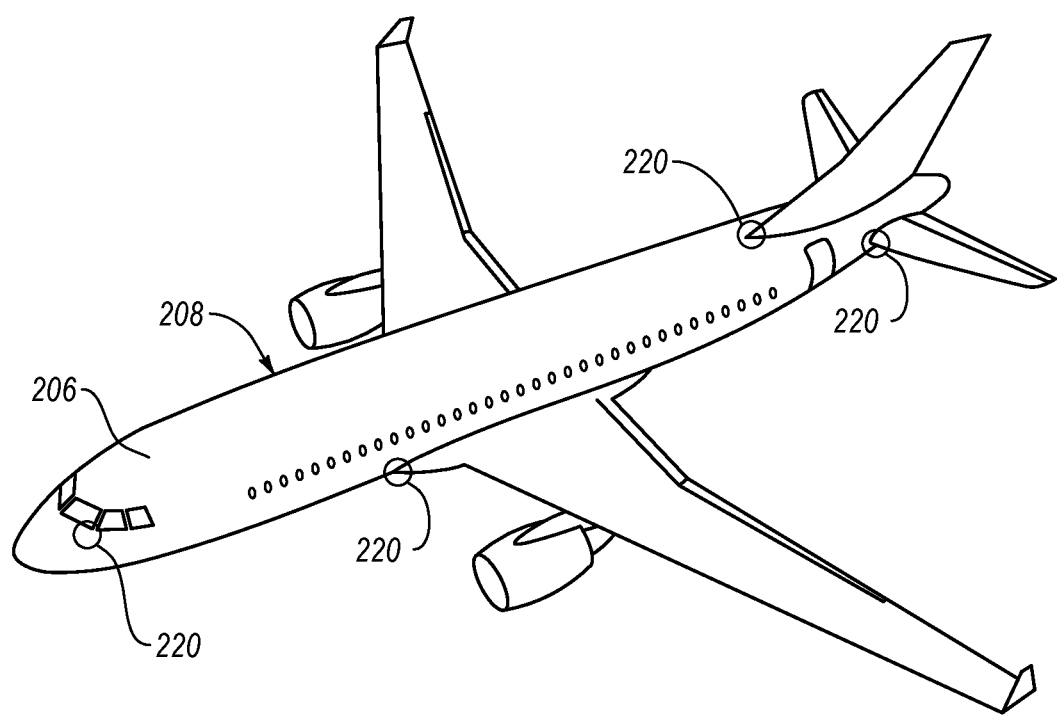
FIG. 7 is a schematic perspective view of an aircraft with obstructions extending from a surface of the aircraft, and features forming an acute angle with the surface, according to one or more examples of the present disclosure.

The end effector 100 is configured to print ink on a surface 206 of an object. The object may be a three-dimensional body with a surface having at least one obstruction, curve, bend, opening, angle, etc. For example, the object may be a vehicle such as a land-based, water-based, aircraft and/or space vehicle. Additionally, the object may be a non-vehicle commercial product such as home appliances, computers, furniture, toys, etc. As shown in FIG. 7, the object is an aircraft 208 having a surface 206 to be printed. The surface 206 of the aircraft 208 has one or more areas 220 where it is difficult and/or time consuming to apply an ink to the surface using conventional methods. Such areas, may include the curved surface of the fuselage and areas around obstructions, such as the wings, stabilizers, rudder, engines, etc., and areas adjacent to window opening.

Figure 8:
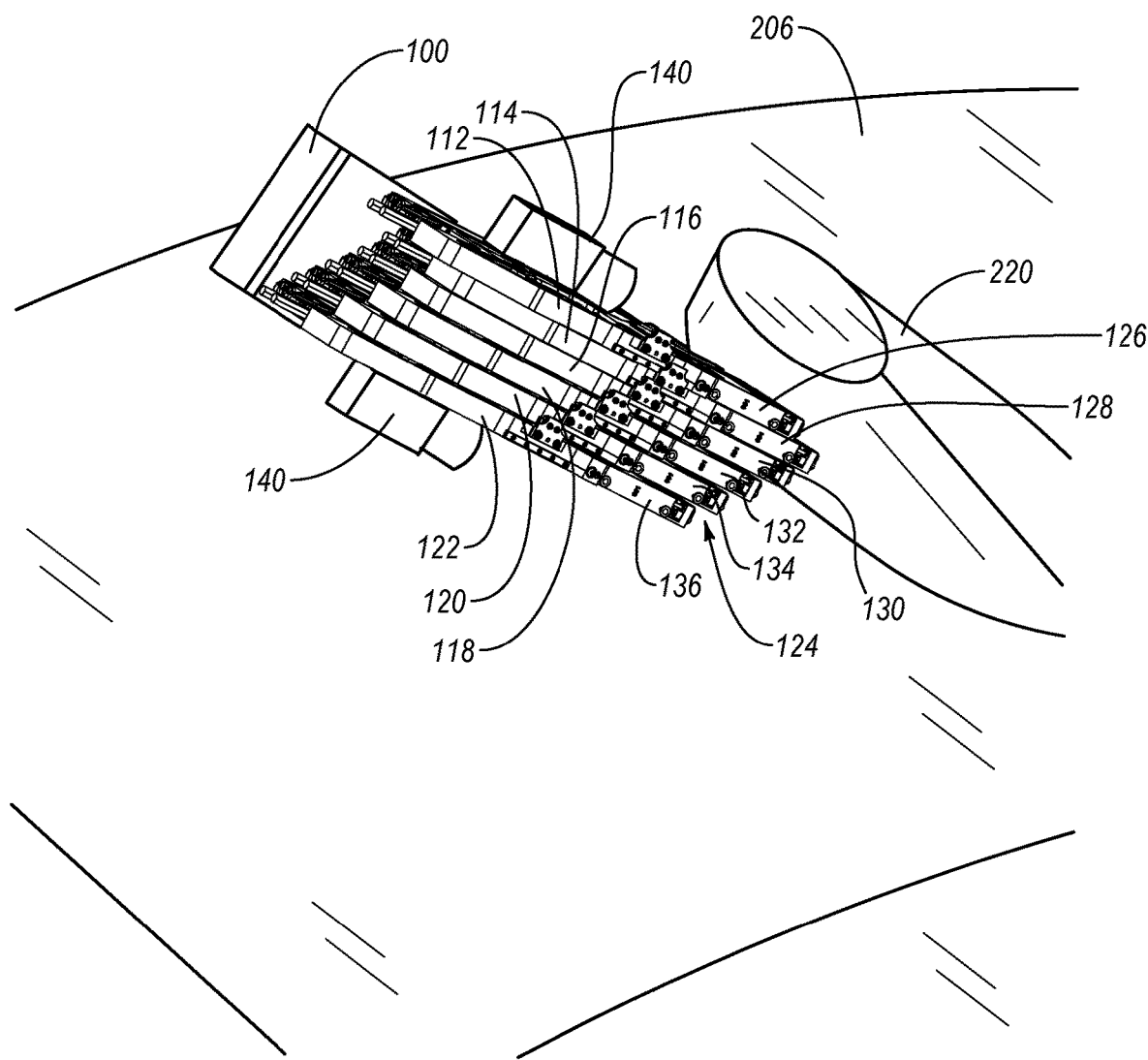
FIG. 8 is a schematic perspective view of an end effector printing within an acute angle formed between a feature and a surface of an object, according to one or more examples of the present disclosure.

The end effector 100, as shown in FIG. 8, can be used to print ink in an angled surface formed by the surface 206 and an obstruction on the surface. By adjusting the plurality of slice assemblies 110 to stagger at least two of the slice assemblies, the end effector 100 can be moved parallel to the x-axis, perpendicular to the first directions 144, as the end effector is continuously moving and printing from a first surface to a second surface, the second surface at an angle from the first surface (e.g., cross-printing). Possible configurations for the plurality of slice assemblies 110 while the end effector 100 is cross-printing are shown in FIGS. 9A-9C.

Figure 10:
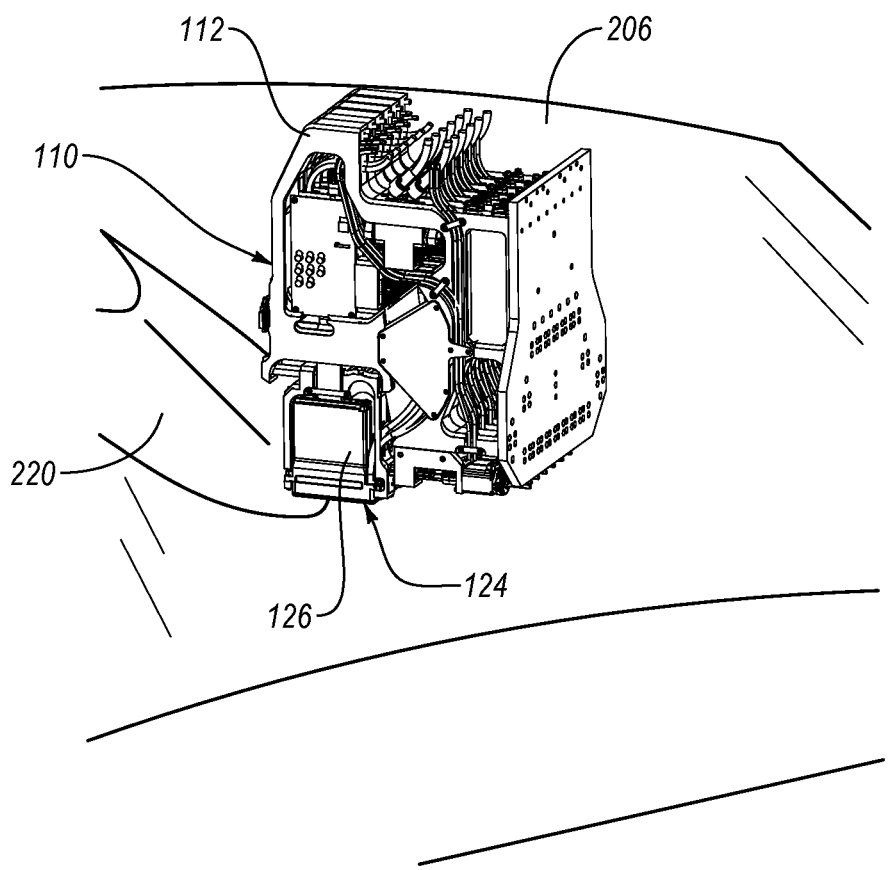
FIG. 10 is a schematic perspective view of an end effector printing around an obstruction on a surface, according to one or more examples of the present disclosure.

As shown in FIG. 10, the end effector 100, can also be used to print ink near and around obstructions. The printheads 124 of the end effector 100 may be adjusted to closely print adjacent to an obstruction as the end effector 100 is moved parallel to the x-axis, perpendicular to the first directions 144, in a sweep printing manner. The printheads 124 may be staggered in the first direction 144, as the end effector 100 is moved to ensure the printheads 124 maintain the desired distance away from the obstruction. A possible configuration for the plurality of slice assemblies 110 while the end effector 100 is printing in a sweep printing manner is shown in FIG. 11.

Figure 12:
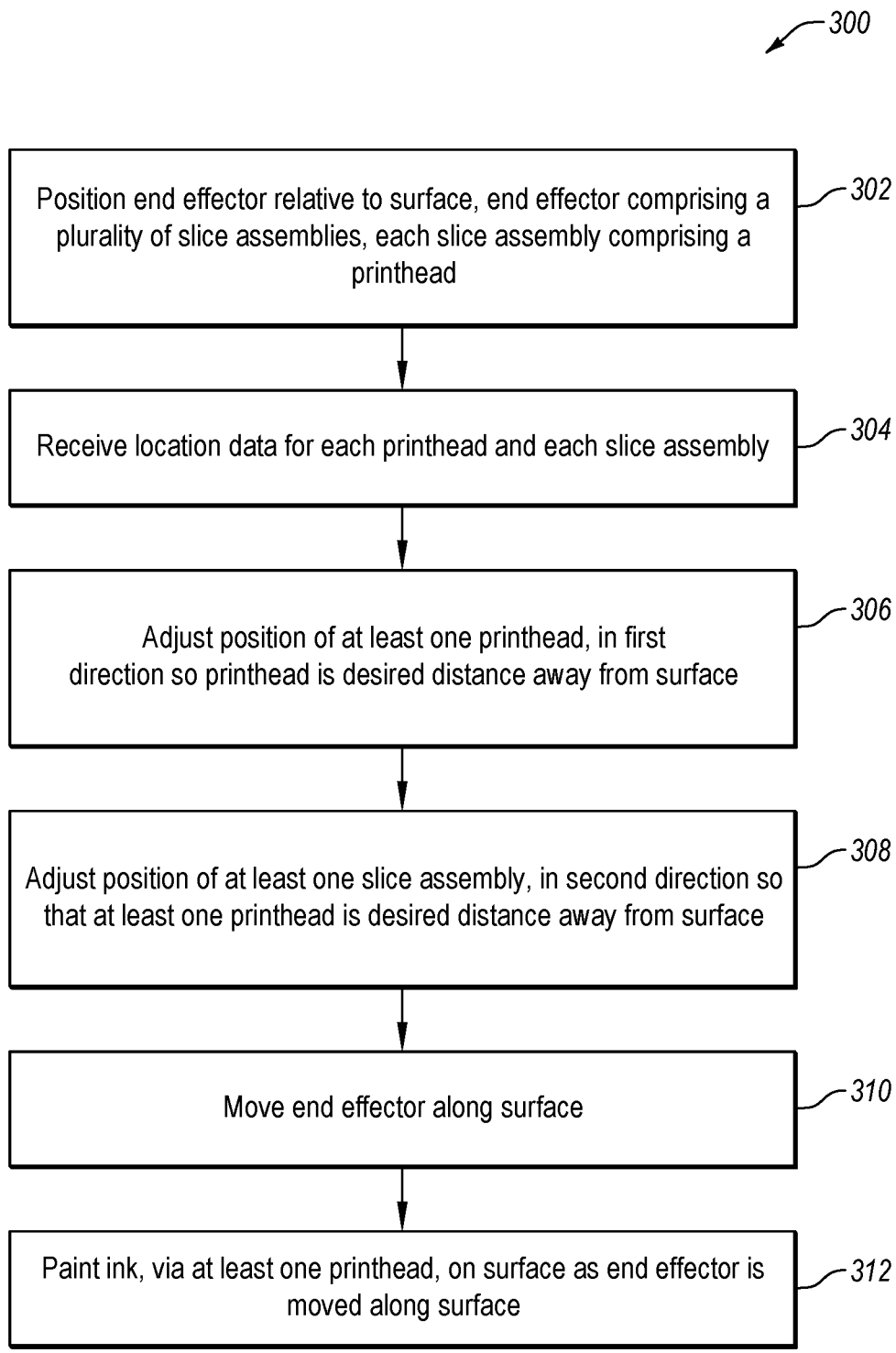
FIG. 12 is a schematic flow diagram of a method of printing on a surface, according to one or more examples of the present disclosure.

As shown in FIG. 12, according to some examples, a method 300 of printing on a surface 206 is shown. The method 300 includes (block 302) positioning an end effector 100 relative to the surface 206. The end effector 100 comprises a plurality of slice assemblies 110 that each include a slice plate 148 slidably coupled to a back plate 104 of the end effector 100. Each one of the plurality of slice assemblies 110 includes a printhead 124 slidably coupled to the slice plate 148.

The method 300 also includes (block 304) receiving location data for each one of the plurality of slice assemblies 110 and each printhead 124 of the plurality of slice assemblies 110. In some examples, an encoder and controller is coupled with each printhead 124. Additionally, in some examples, an encoder and controller is coupled with each one of the plurality of slice assemblies. 110. Each encoder is configured to measure and receive location data for the corresponding printhead 124 or slice assembly 110. Furthermore, each controller is configured to control the movement of the corresponding printhead 124 or slice assembly 110, based on the location data from the corresponding encoder. In other examples, encoders and controllers can be shared between at least two printheads 124 or slice assemblies 110. For examples, one encoder may be configured to measure and receive the location data for a slice assembly 110 and the printhead 124 of the same slice assembly. Likewise, one controller may be configured to control the movement of the slice assembly 110 and the printhead 124 of the same slice assembly.

The method 300 also includes at least one of (block 306) adjusting a position of at least one of the printheads 124, relative to the slice plate associated with the at least one of the printheads 124, and (block 308) adjusting a position of at least one of the plurality of slice assemblies 110, relative to a main block. Adjusting the position of at least one of the printheads 124 is in response to the location data for each printhead 124. The printhead 124 is adjusted, relative to a corresponding one of the slice plates 148, in a first direction 144 so that the at least one printhead 124 is a desired distance away from the surface 206. In some examples, the desired distances away from the surface 206 is the optimal distance away for print ink on the surface. Additionally, adjusting the position of at least one of the plurality of slice assemblies 110 is in response to the location data for each one of the plurality of slice assemblies 110. The slice assembly 110 is adjusted, relative to the back plate 104, in a second direction 146, perpendicular to the first direction 144, so that the at least one printhead 124 of the at least one of the plurality of slice assemblies 110 is the desired distance away from the surface 206.

The method 300 further includes (block 310) moving the end effector 100 along the surface 206. The end effector 100 is moved in along the surface 206, perpendicular to the first directions 144. The method 300 also includes the step of (block 312) printing ink, via at least one of the printheads 124, on the surface 206 as the end effector 100 is moved along the surface 206.

In some examples, the method 300 includes adjusting the position of the at least one of the plurality of slice assemblies 110 to enable printing of a feature on the surface 206 having an acute angle, as the end effector 100 is moved along the surface 206.

In other examples, the method 300 includes adjusting the position of the at least one printhead 124 to enable printing around an obstruction on the surface 206, as the end effector 100 is moved along the surface 206.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. An end effector for printing ink on a surface, the end effector comprising:
   a main block comprising a back plate;
   a plurality of slice assemblies slidably coupled to the back plate, wherein each one of the plurality of slice assemblies comprises a printhead and a y-actuator, and wherein the y-actuator is selectively operable to extend and retract the printhead relative to the back plate, along a y-axis in first directions that are perpendicular to a plane defined by the back plate; and
   a plurality of z-actuators coupled to the back plate, wherein each one of the plurality of z-actuators is selectively operable to extend and retract a corresponding one of the plurality of slice assemblies, parallel to a z-axis in second directions, which is perpendicular to the y-axis, and relative to the back plate.

2. The end effector of claim 1, wherein each printhead is configured to extend and retract parallel to the y-axis in the first directions, independently of any other one of the printheads.

3. The end effector of claim 1, wherein:
   the plurality of slice assemblies are interconnected;
   each one of the plurality of slice assemblies further comprises a front linear rail and a front bracket; and
   the front bracket of each one of the plurality of slice assemblies is movably connected to the front linear rail of an adjacent one of the plurality of slice assemblies such that the front bracket slides along the front linear rail when one of the plurality of slice assemblies moves relative to the adjacent one of the plurality of slice assemblies parallel to the z-axis.

4. The end effector of claim 3, wherein each one of the plurality of slice assemblies is selectively movable, independent of any other one of the plurality of slice assemblies, along the corresponding front linear rail.

5. The end effector of claim 1, wherein:
   a maximum range of motion, parallel to the z-axis, of each one of the plurality of slice assemblies, relative to the back plate, is equal to a first distance;
   a maximum range of motion, parallel to the z-axis, of each one of the plurality of slice assemblies, relative to an adjacent one of the plurality of slice assemblies, is equal to a second distance; and
   the second distance is less than the first distance.

6. The end effector of claim 5, wherein each one of the plurality of slice assemblies is configured to be co-movable with at least one other of the plurality of slice assemblies at any distance greater than the second distance and less than or equal to the first distance.

7. The end effector of claim 1, wherein the plurality of slice assemblies are positionable relative to the main block so that at least one of:

the printheads of the plurality of slice assemblies are co-planar with a plane that is perpendicular to the second directions;
all the printheads of the plurality of slice assemblies are staggered in the second directions; or
at least two of the printheads of the plurality of slice assemblies are co-planar with the plane that is perpendicular to the second directions and at least two of the printheads of the plurality of slice assemblies are staggered in the second directions.

8. The end effector of claim 1, wherein the plurality of slice assemblies are positionable relative to the main block so that at least one of:
the printheads of the plurality of slice assemblies are co-planar with a plane that is perpendicular to the first directions;
all the printheads of the plurality of slice assemblies are staggered in the first directions; or
at least two of the printheads of the plurality of slice assemblies are co-planar with the plane that is perpendicular to the first directions and at least two of the printheads of the plurality of slice assemblies are staggered in the first directions.

9. The end effector of claim 1, wherein the plurality of slice assemblies comprises at least six slice assemblies.

10. The end effector of claim 1, wherein:
the printhead of each one of the plurality of slice assemblies is configured to print ink having a color; and
the color of ink printed by the printhead of each one of the plurality of slice assemblies is different than the color of ink printed by the printhead of any other one of the plurality of slice assemblies.

11. The end effector of claim 1, wherein each one of the plurality of slice assemblies further comprises:
a slice plate;
an ink valve manifold; and
at least one tube extending from the ink valve manifold to the printhead;
wherein:
the ink valve manifold and the at least one tube are confined within a thickness of the slice plate; and
the ink valve manifold is configured to supply ink to the printhead.

12. A system for printing ink on a surface, the system comprising:
a manipulator comprising a manipulator-attachment end, the manipulator-attachment end configured to be selectively movable relative to the surface;
an end effector removably attachable to the manipulator-attachment end, wherein the end effector comprises:
a main block comprising a back plate;
a plurality of slice assemblies slidably coupled to the back plate, wherein each one of the plurality of slice assemblies comprises a printhead and a y-actuator, and wherein the y-actuator is selectively operable to extend and retract the printhead relative to the back plate, along a y-axis in first directions that are perpendicular to a plane defined by the back plate; and
a plurality of z-actuators coupled to the back plate, wherein each one of the plurality of z-actuators is selectively operable to extend and retract a corresponding one of the plurality of slice assemblies, parallel to a z-axis in second directions, which is perpendicular to the y-axis, and relative to the back plate; and a control system coupled to the end effector that is configured to receive data corresponding to a location of each one of the printheads and to control a position of the printheads, relative to the surface.

13. The system of claim 12, wherein the manipulator-attachment end is configured to rotate the end effector in a pitch direction about the y-axis, a yaw direction about the z-axis, and a roll direction about an x-axis, perpendicular to the z-axis and the y-axis.

14. The system of claim 12, wherein:
each y-actuator is coupled to a y-encoder, operable to provide a feedback signal to determine a position of the corresponding printhead, relative to the y-actuator, and a y-controller, operable to control movement of the y-actuator at least partially in response to the feedback signal from the y-encoder; and
each z-actuator is coupled to a z-encoder, operable to provide a feedback signal to determine a position of the corresponding printhead, relative to the z-actuator, and a z-controller, operable to control movement of the z-actuator at least partially in response to the feedback signal from the z-encoder.

15. The system of claim 12, wherein each one of the plurality of slice assemblies further comprises:
a slice plate;
an ink valve manifold; and
at least one tube extending from the ink valve manifold to the printhead;
wherein:
the ink valve manifold and the at least one tube are confined within a thickness of the slice plate; and
the ink valve manifold is configured to supply ink to the printhead.

16. The system of claim 12, wherein the end effector further comprises:
a leading outer frame, fixed relative to the back plate and coupled to a first one of the plurality of slice assemblies; and
at least one distance sensor coupled to the leading outer frame and operable to determine a distance between the leading outer frame and the surface.

17. The system of claim 16, wherein the end effector further comprises:
a trailing outer frame, fixed relative to the back plate and coupled to a last one of the plurality of slice assemblies, wherein the trailing outer frame is spaced apart from the leading outer frame to accommodate the plurality of slice assemblies therebetween; and
at least one distance sensor coupled to the trailing outer frame and operable to determine a distance between the trailing outer frame and the surface.

18. The system of claim 12, wherein each printhead is configured to extend and retract parallel to the y-axis in the first directions, independently of any other one of the printheads.

19. The system of claim 12, wherein the plurality of slice assemblies are positionable relative to the main block so that at least one of:
the printheads of the plurality of slice assemblies are co-planar with a plane that is perpendicular to the second directions;
all the printheads of the plurality of slice assemblies are staggered in the second directions; or
at least two of the printheads of the plurality of slice assemblies are co-planar with the plane that is perpendicular to the second directions and at least two of the printheads of the plurality of slice assemblies are staggered in the second directions.

20. The system of claim 12, wherein the plurality of slice assemblies are positionable relative to the main block so that at least one of:
- the printheads of the plurality of slice assemblies are co-planar with a plane that is perpendicular to the first directions;
- all the printheads of the plurality of slice assemblies are staggered in the first directions; or
- at least two of the printheads of the plurality of slice assemblies are co-planar with the plane that is perpendicular to the first directions and at least two of the printheads of the plurality of slice assemblies are staggered in the first directions.

* * * * *